United States Patent [19]

Veng

[11] Patent Number: 4,627,506
[45] Date of Patent: Dec. 9, 1986

[54] BATCH WEIGHING APPARATUS
[75] Inventor: Niels S. Veng, Glyngöre, Denmark
[73] Assignee: Brdr. Skov A/S, Glyngöre, Denmark
[21] Appl. No.: 634,065
[22] Filed: Jul. 25, 1984
[30] Foreign Application Priority Data
Jul. 29, 1983 [DK] Denmark .............................. 3475/83
[51] Int. Cl.⁴ ..................... G01G 19/22; G01G 19/00; G01G 13/14
[52] U.S. Cl. ..................................... 177/25; 177/145; 177/165
[58] Field of Search ..................................... 177/90-97, 177/1, 25, 145, 165

[56] References Cited
U.S. PATENT DOCUMENTS

| | | | |
|---|---|---|---|
| 3,966,000 | 6/1976 | Allen | 177/91 |
| 4,130,171 | 12/1978 | Smith et al. | 177/91 X |
| 4,137,976 | 2/1979 | Grayson, Jr. | 177/25 X |
| 4,366,872 | 1/1983 | Brunnschweiler et al. | 177/1 |

Primary Examiner—George H. Miller, Jr.
Attorney, Agent, or Firm—Antonelli, Terry & Wands

[57] ABSTRACT

A batch weighing apparatus for receiving a flow of material such as feedstuff and discharging the material in successive weight determined portions is provided with a dischargeable weighing container and a real weighing system. The weighing system is used both for causing the material flow to stop, when the container has received, approximately, a predetermined weight of material, and to thereafter weigh the material portion with high accuracy. The material flow is not restarted until the container has been emptied. For high accuracy the weighing results are differential, the container being weighed both before and after emptying. A simple and cheap electronic weighing system of high accuracy contributes to a low cost apparatus, which is then an advantageous alternative to the more primitive traditional batch weighing apparatus.

3 Claims, 3 Drawing Figures

BATCH WEIGHING APPARATUS

The present invention relates to a weighing apparatus of the batch weighing type for receiving a flow of material such as feedstuff, and for summarized weight determination of successively discharged portions of the material.

A commonly used type of a batch weighing apparatus for feedstuff consists of a double compartment tilt container, which receives a falling material flow in a first compartment until this compartment is filled enough to make the entire container tilt over; thereafter the material flow is received in the opposed other compartment, and a bottom valve in the first compartment is opened for letting out the material portion therefrom. This operation is repeated for each tilting to and fro, and the apparatus is designed such that the container will tilt over as soon as the respective active compartment has received a predetermined amount of material, e.g. 10 kg. Ideally, therefore, each tilting will represent the dosing out of a known weight of material, and for determining the total weight of an amount of material thus "weighed out" during a relatively long period of time it will be sufficient then, to provide for a simple automatic counting of the number of tilts of the container. While the single feedstuff portions would not normally have to be very exactly weighed out it is nevertheless desirable to obtain a fairly accurate sum result of the weighings, for comparison with the weight of a charge of the feedstuff as previously delivered to the user of the weighing apparatus. Particularly for this reason the single discharged material portions should be well defined by weight anyway.

In the prior art weighing apparatuses of the relevant type the determination by weight of the single material portions is rather inaccurate, because additional material will get time to fall down into the active compartment upon the tilting of the container having been initiated; there is no practical possibility of stopping the falling material flow, because the flow itself conditions the tilting or tipping to take place. A reduction of the flow during the last phase of the compartment filling would result in a considerably reduced flow-through capacity of the apparatus. Moreover, an important source of error will be material sticking to the container compartment, whereby the discharged amount of material will be less than the "weighed out" amount.

It is the purpose of the invention to provide a batch weighing apparatus for the relevant use which may operate with a highly improved accuracy. Hereby a real weighing of the material will take place, but the weighing system may be used additionally to roughly determine the size of each material portion by causing an abrupt stoppage of the supply flow of the material. The real weighing takes place shortly thereafter, whereby the recordable weighing result can be very accurate, even though the weight of the single material portions is only roughly conditioned.

For the weighing accuracy it is essential that use is made of a principally known weighing principle, viz. that the weighing result is found as the difference between the weights of the filled and the emptied container, respectively, as it will be unimportant, then, whether material rests are sticking to the container. Likewise it will hereby be permissible that the weighing system includes elements, which cannot be expected to remain of constant weight, e.g. an oil filled gear motor for the opening of the bottom outlet on the container or—preferably—for turning the container upside down for the emptying thereof.

Relatively to the said known batch weight apparatuses the weighing accuracy will hereby be widely improvable, even with the use of a mechanically simple arrangement as conditioned by the application of weighing cells and electronic equipment as known per se. On the other hand, the electronic equipment including the weighing cells should be both cheap and accurate in order to make the weighing apparatus of the invention an advantageous alternative to the more primitive tilt container apparatus. In connection with the invention, therefore, a particularly simple and reliable electrical weighing system has been developed, as described below.

In the following the invention is described in more detail with reference to the drawing, in which FIG. 1 is a perspective view, partly in section, of a weighing apparatus according to the invention.

Figure 1:
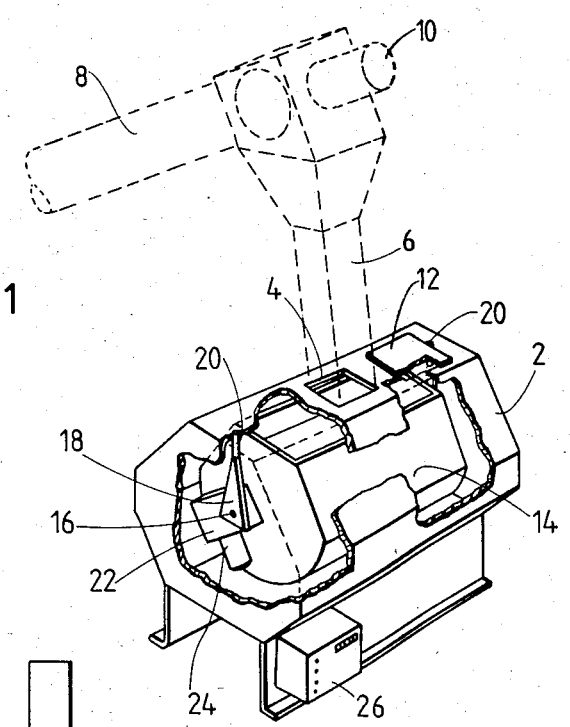

In FIG. 1 is shown a batch weighing apparatus comprising an outer housing 2, which has an open bottom and an upper inlet opening 4 for reception of granular material to be weighed before delivery through the open bottom. By way of example, the material may be supplied through a pipe 6 from a conveyor worm 8, which is driven by a motor 10. Topwise the housing 2 has an inspection opening as covered by a lid 12.

Inside the housing 2 is arranged a turnable, normally upwardly open container 14 having endwise opposed shaft pins 16, through which the container is suspended in brackets 18 hanging down from the ceiling of the housing 2 through respective weighing cells 20. At one end (front end) of the container 14 the bracket 18 is provided with a gear box 22 and an associated motor 24, which, through the gear box 22, is operable to rotate the container between the position shown and an upside down emptying position. On the housing 2 is mounted an electronic control and registration unit 26, which, externally, is connected with the drive motor 10 of the worm 8 or with any other device for effectively stopping and reestablishing the supply flow of material to the container 14.

Underneath the housing 2 a non-illustrated conveyor means may be arranged for conveying the material as delivered from the weighing apparatus to the relevant place or places of use, e.g. to a row of stock feeding positions.

Figure 2:
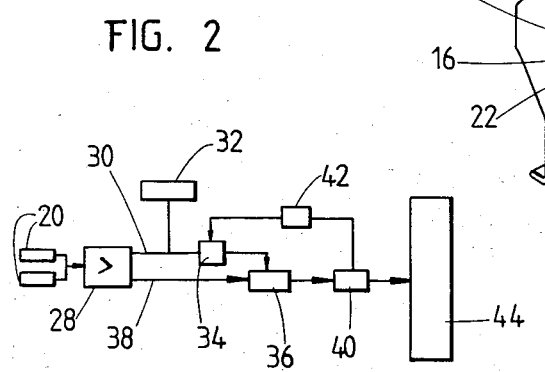
FIG. 2 is a schematic diagram of the electrical equipment of the apparatus.

By means of the control unit 26 the apparatus operates as follows, reference being made to FIGS. 1 and 2:

The motor 10 operates to deliver material to the container 14 through the inlet 4. The weight of the container is measured by the weighing cells 20, which are connected with an amplifier 28 designed so as to produce, on an output terminal 30, a control signal in response to the weight of the container reaching a predetermined value corresponding to a desired weight of the material portion in the container. This control signal is supplied to a contactor 32 for stopping the motor 10 or correspondingly actuating a mechanism for interrupting the material flow to the container 14, and the control signal is also supplied to a unit 34, which represents a delay unit or a "rest detector" adapted so as to produce a second control signal to a gate 36, when the container 14 is ready to be weighed with full accuracy. The gate 36 is hereby opened for conducting the output weighing signal of the amplifier 28 via a wire 38 to a registration unit 40, which, in response to the reception of the weighing signal, actuates a control unit 42 for starting the motor 24, whereby the container is turned into and then back again from its emptying position.

From the control unit 42 a control signal is sent back to the rest indicator 34, whereby a new weighing signal, now representing the weight of the emptied container 14, is passed to the registration unit 40, and in this unit is then carried out a subtraction between the weights of the full and the empty container, respectively. The result of this subtraction, which represents the accurate weight of the handled material portion, is transferred to a summarizing register 44.

Thus, the latter register 44 will at any time indicate the weight of the total amount of material as dispensed through the weighing apparatus since the last resetting of the totalizer. If desired the register 44 may be connected with a remote display or counter for indicating the larger of the digits, e.g. the units of 10 kg, while the weighing and summarizing accuracy may be below 1 g. The remote display, of course, could well show the total results in units other than 10 kg, e.g. even 20 or 25 kg.

When the weight of the emptied container 14 has been registered by the registration unit 40, this unit delivers a control signal to the control unit 42, which responds by causing the container 14 to be turned back into normal position, whereafter the weighing apparatus is ready for the next operation cycle, starting with an actuation of the worm motor 10 or otherwise a reopening of the supply material flow.

As mentioned, it is essential both that the weighing apparatus should operate with a high accuracy for counteracting considerable summarizing errors and that such high accuracy in the electronic weighing system be achieved in a cheap manner, as it is otherwise well known that a high accuracy and stability of such a system will require expensive circuits and components, e.g. with respect to the weighing cells and the voltage supply of these cells and the weighing amplifier. In contrast to the known tilt container devices the weighing apparatus of the invention is a real weighing machine, even, though in normal use it will only weigh roughly similar material portions within a restricted range, e.g. 8–11 kg, and for making the machine a realistic and advantageous alternative to the relevant known devices it has been essential to develop the weighing system itself for achieving a high accuracy in a cheap manner.

Figure 3:
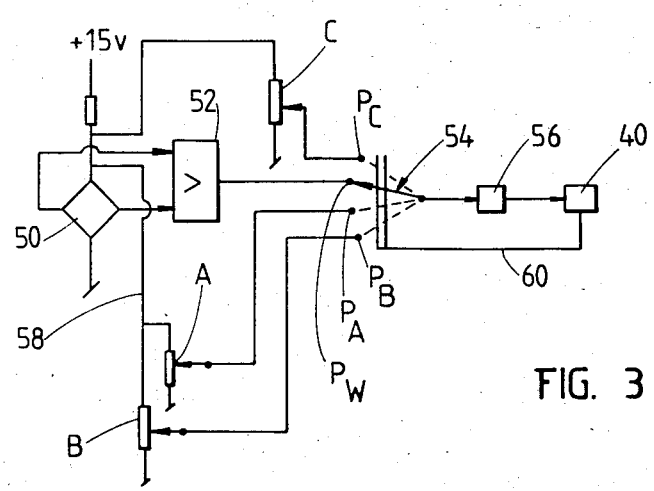
FIG. 3 is a corresponding diagram of a preferred design of a part of this equipment.

The new weighing system is illustrated in FIG. 3, in which the weighing cell system as comprising two cells in parallel is designated 50; in the following the cell system is referred to as a single cell. This cell receives a supply voltage of e.g. 15 V, and its output signal is supplied to a conventional weighing signal amplifier 52, which, itself, may be both accurate, stable and cheap. Through a switchover switch 54 the output signal of the amplifier is fed to an analogue-to-digital converter 56, the output of which is connected with the said registration unit 40. For clarity the units 34 and 36 of FIG. 2 are not shown in FIG. 3.

Through a wire 58 the supply voltage on the weighing cell 50 is supplied to two voltage dividers A and B, the respective branch outputs of which are connected to contact points $P_A$ and $P_B$ in the switch 54, the third contact point of which is designated $P_W$.

The voltage divider A is adjusted such that the voltage in the contact point $P_A$ is the same as in the point $P_W$, when the container 14 is weighed in an empty condition. The voltage divider B is adjusted such that the voltage in the point $P_B$ is the same as in the point $P_W$, when the container 14 is weighed with a calibration load, e.g. a weight of 20 kg, which may be placed in the container through the said upper inspection opening as covered by the lid 12 (FIG. 1). Typically the described weighing machine should be used for handling material portions within the range of 10–30 kg, and it may be provided with non-illustrated selector means for a presetting of the desired approximate weight of the portions within this range, i.e. for predetermining the weighing amplifier output voltage at which the unit 32 of FIG. 2 reacts for stopping the material supply flow, when the desired approximate weight of the collected material portion has been attained. Just when the operative range is the said 10–30 kg, the calibration load will suitably (though not critically) be the said 20 kg.

Thereafter the calibration load is removed, and the weighing machine is now operative.

For each operative weighing with the switch 54 in position $P_W$ a comparison is made with the voltage in $P_A$, by the weighing of the empty container, and with the voltage in $P_B$ by the weighing of the loaded container, i.e. the switch 54 is shifted rapidly for enabling the respective two measuring values for "loaded container" (in $P_W$ and $P_B$) to be fed to a memory unit in the registration unit 40 and thereafter for enabling the corresponding two values (in $P_W$ and $P_A$) by the following weighing of the emptied container to be fed to the same or a corresponding memory unit. Principally, the switching over of the switch 54 may be effected manually, but it will be appreciated that with modern electronics the switching is very easily automatically controllable, and for this purpose a control wire 60 is indicated between the registration unit 40 and the switch 54.

The registration unit 40 with its associated memory unit or units comprises a calculator unit for calculation of the weighing result W according to the following expression:

$$W = \frac{V_{P_W}(\text{full weight}) - V_{P_W}(\text{empty weight})}{V_{P_A} - V_{P_B}} \times K, \text{ where}$$

where
$V_{P_W}$ is the voltage in the point $P_W$,
$V_{P_A}$ and $V_{P_B}$ are the voltages of points $P_A$ and $P_B$, respectively, and
K is the calibration weight. The expression can be abbreviated to $$W = \frac{\Delta P_W}{\Delta P_{AB}} \times K.$$

The factor $K/\Delta P_{AB}$ denominates the relation between the calibration weight and the associated difference between the full weight and the empty weight voltage in the point $P_W$ at the time the calibration adjustments of the voltage dividers A and B were made. This factor, therefore, expresses this voltage difference per kg, and when the factor is multiplied by $\Delta P_W$, which is the voltage difference between full weight and empty weight of the container 14 for an actual weighing, then the actual weighing result will be calculated and expressed in kg.

The accuracy of this calculation is dependent on a pronounced linearity of or in the electronic weighing system, but as well known such a linearity is achievable without the use of particularly expensive circuits or components, i.e. the weighing results will be correct not only when the weights are close to the calibration weight, but also when they are both above and below the calibration weight.

So-called drift may occur in the weighing amplifier 52, whereby its output voltage may gradually change relative to its input voltage. Such a change, however, will be equal for all measuring values, and when the weighing result is based upon an almost instantaneous difference measurement such a gradual change will be unimportant for the weighing accuracy, this being well known in the art.

In conventional weighing circuits, however, it is an important source of error that changes may occur in the voltage supply to the weighing cell, and it is customary, therefore, to make use of expensive, stabilized voltage or current supply units. However, such sources of error will be eliminated with the use of the special system according to the invention, such that a simple and cheap voltage supply unit will be usable:

Should the supply voltage of the weighing cell 50 change, then the difference result of the single weighing will be changed correspondingly, since, of course, the difference will be larger or smaller all according to the supply voltage on the weighing cell having increased or decreased, respectively. In connection with the invention, however, the voltage dividers A and B will be subjected to exactly the same change of voltage, whereby the adjusted branch voltages in the points $P_A$ and $P_B$ will show correspondingly changed difference value, which will still refer to a weighing of the calibration weight. The factor of change, itself, will be the same for the values $\Delta P_W$ and $\Delta P_{AB}$ in the above expression of the weight W, and it will thus be eliminated from the expression, i.e. it will be without any significance for the accuracy of the weighing result.

Even a corresponding drift in the converter 56 will be without importance, because the actual weighing result is steadily compared with a known result, viz. the differential value between the voltages in the points $P_A$ and $P_B$ as expressing the weighing result of the calibration weight. This differential value will vary together with various sources of error in the system and will thus out-compensate the possible errors in the final weighing result, when the latter is calculated according to the above expression. It is permissible, therefore, to widely accept the sources of errors rather than to fight them in an expensive manner.

It should be mentioned that the provision of the said unit for calculating the weighing results according to the said expression and the associated memory means and control means for operating the switch 54 is deemed to be a matter of ordinary skilled expert work, such that a more detailed description of these units should here be superfluous.

In FIG. 3 is shown a further voltage divider C, the tap of which is connected with a fourth contact point $P_C$ of the switch 54. In the calibration phase the voltage in $P_C$ is adjusted to be equal to the voltage in the point $P_W$, when the container is loaded as desired for the generation of the control signal causing the material flow to be stopped via unit 32 in FIG. 2. In operation during the flow stop phase the switch 54 is steadily switched between the points $P_W$ and $P_C$, and the said control signal is generated in response to the voltage in $P_W$ having increased to be equal to the voltage in $P_C$. Even in case of considerable drift of the supply voltage to the weighing cells and the voltage dividers, therefore, the "desired load" or the size of the material portions will remain substantially constant. Instead of using the switch 54 for this purpose it is of course possible to use any suitable comparator for the voltages in $P_W$ and $P_C$.

What is claimed is:

1. A weighing apparatus of the batch weighing type for receiving a flow of a material such as feedstuff and for summarized weight determination of successively discharged portions of the material, comprising an automatically dischargeable weighing container connected with a real weighing system for absolute weighing of each material portion before and after discharge thereof to obtain automatic taring in connection with the weighing of each material portion, said weighing system having means for producing a control signal for effecting temporary stoppage of the supply flow of the material when a coarse weight has been reached in response to the container being filled to a predetermined load and means for shortly thereafter effecting an accurate weighing of the container and transferring the weighing result into an associated summarizing register upon correction for the weight of an empty container, a control unit operable for actuating discharging of the container subsequent to the weighing and for restarting of the supply flow of the material when the container is ready to receive the next material portion, and means included in the container system suspended in a weighing cell system and comprising a gear motor for tilting the weighing container between a receiving position and a discharge position.

2. A weighing apparatus of the batch weighing type for receiving a flow of material and for summarized weight determination of successively discharged portions of the material, comprising an automatically dischargeable weighing container connected with a weighing system for absolute weighing of each material portion before and after discharge thereof, said weighing system having means for producing a control signal to effect temporary stoppage of the supply flow of the material in response to the container being filled to a predetermined load and means for shortly thereafter effecting an accurate weighing of the container and for transferring the weighing result into an associated summarizing register upon correction for the weight of the empty container, and a control unit for actuating the discharging of the container subsequent to the weighing and for restarting of the supply flow of the material when the container is ready to receive the next material portion, wherein the weighing system comprises a weighing cell system with an associated voltage supply source and a weighing amplifier, the output signal of which, by weighing, is supplied to a weight registrating unit, the output of the amplifier is connected with the registrating unit through a change-over switch, by means of which the registrating unit is successively connectable with the amplifier output and two other terminals, respectively, said other terminals each being connected with a variable tap of an associated voltage divider, these two voltage divers being connected in parallel with the voltage source of the weighing cell system; one of the voltage dividers is adjustable for producing a tap voltage equal to the amplifier output voltage by weighing of the empty container, while the other voltage divider is correspondingly adjustable to produce a tap voltage equal to the amplifier output voltage by weighing of the container as loaded by a calibration weight, and the registrating unit comprises or is connected with a memorizing and calculatory unit for determining, by each operational weighing, the weighing result, W, according to the expressing.

$$W = \frac{\Delta P_W}{\Delta P_{AB}} \times K,$$

where $\Delta P_W$ is the difference between the output voltages of the amplifier for full weight and empty weight, respectively, $\Delta P_{AB}$ is the difference between the tap voltages of the said two voltages dividers, and K is the calibration weight, and control means is provided for operating said change-over switch for successive transfer of the respective single voltage values to the memorizing and calculating unit.

3. A weighing apparatus according to claim 2, in which a further voltage divider is initially adjustable to produce a voltage equal to the amplifier output voltage, when the container is loaded to the "desired weight", while comparator means in operation, are operable to produce the control signal for stoppage of the material flow in response to the amplifier output voltage increasing to the voltage as produced by the voltage divider.

* * * * *